(12) United States Patent
Kaufleitner et al.

(10) Patent No.: US 9,703,672 B2
(45) Date of Patent: Jul. 11, 2017

(54) METHOD FOR VERIFYING THE PROCESSING OF SOFTWARE

(71) Applicant: BERNECKER + RAINER INDUSTRIE-ELEKTRONIK Ges.m.b.H, Eggelsberg (AT)

(72) Inventors: Franz Kaufleitner, Hochburg-Ach (AT); Alois Holzleitner, Braunau am Inn (AT)

(73) Assignee: BERNECKER + RAINER INDUSTRIE-ELEKTRONIK Ges.m.b.H, Eggelsberg (AT)

( * ) Notice: Subject to any disclaimer, the term of this patent is extended or adjusted under 35 U.S.C. 154(b) by 189 days.

(21) Appl. No.: 14/601,289

(22) Filed: Jan. 21, 2015

(65) Prior Publication Data

US 2015/0205698 A1    Jul. 23, 2015

(30) Foreign Application Priority Data

Jan. 23, 2014  (AT) .............................. A 50043/2014

(51) Int. Cl.
*G06F 11/00*    (2006.01)
*G06F 11/36*    (2006.01)
(Continued)

(52) U.S. Cl.
CPC ...... *G06F 11/3612* (2013.01); *G06F 11/1487* (2013.01); *G06F 11/1637* (2013.01)

(58) Field of Classification Search
CPC ............. G06F 11/1479; G06F 11/1487; G06F 11/1494; G06F 11/1629; G06F 11/1633;
(Continued)

(56) References Cited

U.S. PATENT DOCUMENTS 4,622,667 A * 11/1986 Yount ...................... G05B 9/03
                                                  700/79
6,199,171 B1 * 3/2001 Bossen ............... G06F 11/1474
                                                  714/12
(Continued)

FOREIGN PATENT DOCUMENTS

DE       102 12 151        1/2004
EP       0 910 018         4/1999
EP       1 316 884         6/2003

OTHER PUBLICATIONS

Austrian Search Report conducted in counterpart Austrian Appln. No. A 50043/2014 (Jul. 4, 2014).

*Primary Examiner* — Marc Duncan
(74) *Attorney, Agent, or Firm* — Greenblum & Bernstein, P.L.C.

(57) ABSTRACT

In order to provide simple, fast, and reliable verification of the functioning and processing of an automation task in the form of software in a multi-channel safety-oriented automation component (1), the software (SW1) is run in one channel (K1) of the automation component (1) in an active unit (P1) of the hardware of the channel (K1), and first diversity software (SW3) redundant relative to the software (SW1) is run in a verification unit (V1) in this channel (K1), wherein in a processing step (Z1) input data ($E_z$) associated with the software (SW1) and first output data ($A_z$) computed by the software (SW1) in this processing step (Z1) are temporarily stored in a memory unit (M1), and the diversity software (SW3) in the verification unit (V1) computes second output data ($A_z'$) based on the stored input data ($E_z$) independently of the processing of the software (SW1) in the active unit (P1), and the second output data ($A_z'$) computed by the diversity software (SW3) is compared with the stored first output data ($A_z$) of the software (SW1) in order to verify the processing.

7 Claims, 2 Drawing Sheets

(51) Int. Cl.
*G06F 11/14* (2006.01)
*G06F 11/16* (2006.01)

(58) Field of Classification Search
CPC ... G06F 11/1637; G06F 11/3612; G05B 9/03; G05B 19/0421; G05B 19/0425; G05B 19/0428; G05B 19/048; G05B 23/0237
See application file for complete search history.

(56) References Cited

U.S. PATENT DOCUMENTS

| | | | |
|---|---|---|---|
| 7,213,239 B2 | 5/2007 | Pavlik | |
| 7,987,385 B2* | 7/2011 | Pruiett | G06F 11/1641 714/10 |
| 8,499,193 B2* | 7/2013 | Wilt | G06F 11/1637 714/12 |
| 9,052,887 B2* | 6/2015 | Rohleder | G06F 9/28 |
| 2006/0095821 A1* | 5/2006 | Mukherjee | G06F 11/1494 714/736 |
| 2006/0200278 A1* | 9/2006 | Feintuch | G05B 9/03 701/3 |
| 2009/0240347 A1* | 9/2009 | Walders | G05B 19/0428 700/9 |
| 2013/0212441 A1* | 8/2013 | Vilela | G05B 9/03 714/49 |

* cited by examiner

METHOD FOR VERIFYING THE PROCESSING OF SOFTWARE

CROSS-REFERENCE TO RELATED APPLICATIONS

The present application claims priority under 35 U.S.C. §119(a) of Austrian Patent Application No. A50043/2014 filed Jan. 23, 2014, the disclosure of which is expressly incorporated by reference herein in its entirety.

BACKGROUND OF THE INVENTION

1. Field of the Invention

The invention relates to a method for verifying the processing of an automation task in the form of software in a multi-channel safety-oriented automation component.

2. Discussion of Background Information

Whenever electronic automation components, such as e.g., control devices, actuator, sensors, etc., are employed to perform tasks of personal protection, these components must meet stringent requirements. An essential aspect of these requirements involve designing the automation components to be sufficiently robust so that no conditions can arise which would endanger any persons in the vicinity of the automation components if any defects occur in the automation components. Electronic automation components of this type are typically provided with a diagnostic function in order to meet these requirements. The job of this diagnostic function is to detect any possible errors in the active unit of the automation component and to deactivate those elements of the automation component that are affected by the errors, or to initiate another safety-oriented action. An active unit is understood to refer to a component that processes data, makes calculations, etc., that is, typically units like processors, arithmetic units, programmable logic controllers, etc. Safety-relevant functions in an automation component are usually also implemented-in a multi-channel design in order to achieve the required safety level, e.g., an SIL (safety integrity level) complying with IEC 61508 or other standards. In a multi-channel design a safety-relevant function is provided in multiple form, and a calculation of the function is only considered to be valid if all channels supply the same result.

For developing safety-oriented automation systems or automation components so-called Failure Mode and Effects Analysis (FMEA) are implemented. These are analytical methods that are known per se for finding potential weak points and have the goal of precluding errors and enhancing technical reliability.

The diagnostic function in an automation component is generally designed to diagnose and recognize possible errors that are determined e.g. in the course of the system design in an FMEA. The diagnostics routines are implemented statically in the automation component in separate diagnostics processors and not adapt, or only poorly adapt, themselves to the application-specific environment in the active unit of the automation component. Whenever complex electronic modules, such as, for example, processors are used in the automation component, comprehensive and expensive diagnostics functions are required, such as e.g., op-code tests and register tests. As the complexity of the processor used and/or software running thereon increases in complexity, it becomes more and more difficult to properly implement the diagnostics in the automation component. Furthermore the diagnostics cannot be implemented for all possible applications of an automation component, with the result that the diagnostics cannot provide one-hundred-percent safety and reliability.

As a result, the channels of a safety-oriented multi-channel automation component are implemented using a diversity scheme—either through diversity hardware or diversity software. Diversity in the technical context means that a system or a function is implemented redundantly, where deliberately different implementations of the system or of the function are used. Consequently the various channels of the multi-channel automation component here are implemented differently, that is, with different hardware or different software. An automation task is thus performed in the automation component using different hardware or different software and the different implementations of the automation task must deliver the same results if there are no errors.

Using diversity hardware (see FIG. 1) requires that processors having different processor cores must be used in the various channels. However, the current trend among processor manufacturers is in a completely different direction, in particular, towards focusing on as few different processor cores as possible. Many manufacturers producing processors for the embedded segment, such as those that are also employed in automation components, are using what are known as ARM (Advanced RISC Machines) cores in their products, with the result that hardware diversity is then possible only by using "exotic" processors. Of course "exotic" processors are not in widespread use and thus have no real proven track record, a factor that is also a critical aspect in terms of applications in safety-oriented automation components in the area of personal safety. The trend for safety-oriented automation components is thus toward homogeneous hardware.

An alternative solution approach is therefore to design the diversity scheme into the software (see FIG. 2). This enables errors in the processor core or memory to be detected with sufficiently high probability. Diversity software has the disadvantage, however, that the run time can vary considerably on the different channels. The performance of the automation components of a multi-channel system is, however, governed by the slowest channel since the result found is valid only after the data have been compared.

SUMMARY OF THE EMBODIMENTS

The object of the invention is therefore to provide a method for effecting a simple, fast, and reliable verification of the function and processing of an automation task in a multi-channel safety-oriented automation component, which method does not have the above-referenced disadvantages.

This object is achieved according to the invention by an approach wherein the software in a channel of the automation component is run in an active unit of the hardware of the channel, and first diversity software redundant relative to the software is run in a verification unit in this channel, wherein in a processing step input data associated with the software and first output data computed by the software in this processing step are temporarily stored in a memory unit, and the diversity software in the verification unit computes second output data based on the stored input data independently of the processing of the software in the active unit, and compares the second output data computed by the diversity software with the stored first output data of the software in order to verify the processing.

This approach enables verification of the software processing in the active unit of a channel to be decoupled from the diversity software. The processing of the software in the active unit, that is, execution of the actual automation task, is not impeded thereby such that the performance of the automation component is essentially dependent on the software processing in the active unit but not on the verification by the diversity software. This approach thus succeeds in implementing an automation component including diversity software, which component, however, does not suffer any degradation in performance as found in the prior art. In order to accomplish this it is also irrelevant whether the hardware is implemented diversified or homogeneously.

Implementing verification of the software by means of the diversity software after an $n^{th}$ processing step of the software, where n is a positive integer greater than one, also allows the diversity software to be slower than the software in the active unit of the channel. In particular, this also enables diversity software created by coded processing to be used that as a rule runs slower by orders of magnitude than the software to be verified. This approach also allows the diversity software to be run on a verification unit that operates more slowly than the active unit of the channel.

Especially advantageously the verification unit is implemented in a diagnostics unit in which diagnostics functions are run as diagnostics software in addition to the diversity software. This enables hardware provided in the channel to be used simultaneously to perform the verification.

The verification is preferably also effected in a second channel or in all channels of the multi-channel safety-oriented automation component, which action further enhances the safety and reliability of the automation component.

The safety and reliability of the automation component can also be increased if output data are computed respectively in two channels of the multi-channel safety-oriented automation component in one processing step of the software, which output data are compared following the processing step.

BRIEF DESCRIPTION OF THE DRAWINGS

The following discussion describes the invention in more detail below with reference to FIGS. 1 through 3 which depict advantageous embodiments of the invention, this being done by way of example, schematically, and without being restricted thereto. Here

DETAILED DESCRIPTION OF THE EMBODIMENTS

Figure 1:
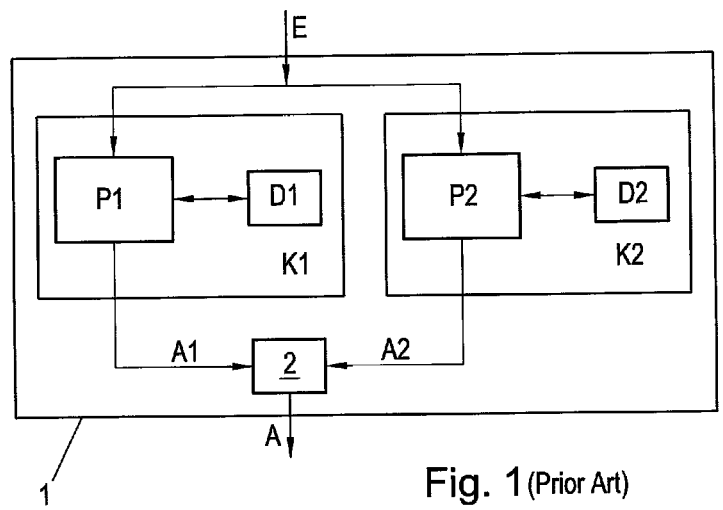
FIG. 1 depicts a safety-oriented automation component of the prior art.

FIG. 1 depicts a safety-oriented automation component 1 according to the prior art. Two channels K1, K2 are implemented therein. Each channel K1, K2 comprises an active unit P1, P2, and a diagnostics unit D1, D2. Active unit P1, P2 is, for example, a processor, a programmable logic controller (e.g., a Field Programmable Gate Array (FPGA)) or a similar component that can process data or perform calculations. Active unit P1, P2 performs an automation task implemented thereon, e.g., data manipulation, a calculation, etc. Diagnostics unit D1, D2 is implemented in the form of a programmable component, such as e.g. a processor, on which diagnostics functions are implemented as software in order to detect and handle errors in active unit P1, P2. Diagnostics unit D1, D2 thus verifies the functioning of active units P1, P2, and intervenes whenever errors are detected, e.g., by deactivating certain functions of active units P1, P2, or by transferring automation component 1 to a reliable state, optionally in connection with outputting an error message, e.g., to a higher-level controller. From input data E such as, e.g., control data or measurement parameters, each channel K1, K2 calculates output parameters A1, A2 that are compared in a comparison unit 2, e.g. a separate comparison unit or also one of active units P1, P2, and are outputted as valid output data A, e.g. control parameters, computed results, etc., if the values are equal. The hardware, here active units P1, P2, can be implemented either diversified or identically.

Figure 2:
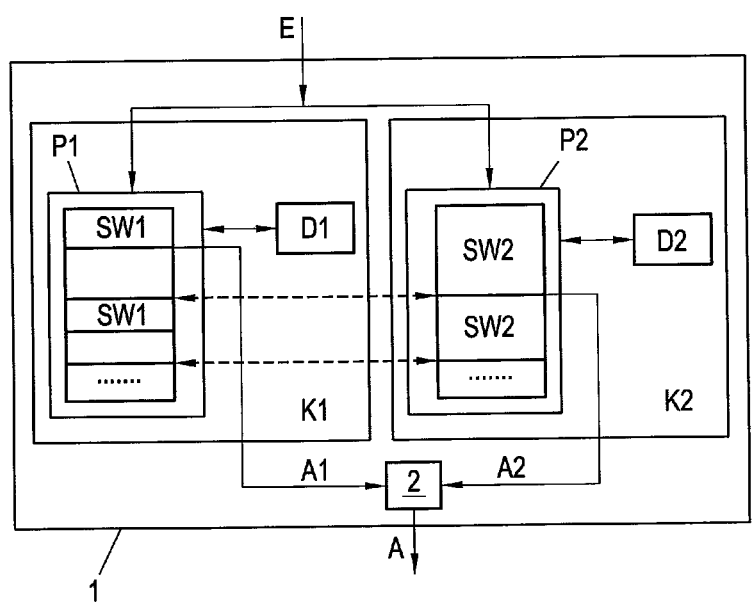
FIG. 2 depicts a safety-oriented automation component of the prior that includes diversity software.

FIG. 2 depicts an example based on FIG. 1 that includes diversity software in active units P1, P2. The software SW1 in active unit P1 of first channel K1 is faster here than the software SW2 in the active unit of second channel K2. This means that software SW1 of first channel K1—e.g., when processing a given automation task, procedure, or given function—generally has to wait for software SW2 of second channel K2, e.g. when it processes the same automation task, procedure, or function (as indicated by dashed double arrow), since the results of processing, e.g. output data A1, A2, have to be compared after each processing. Slower software, here SW2, thus determines the speed of the automation components. Verification in the example illustrated is effected, e.g., after a complete code cycle of software SW1, SW2.

Figure 3:
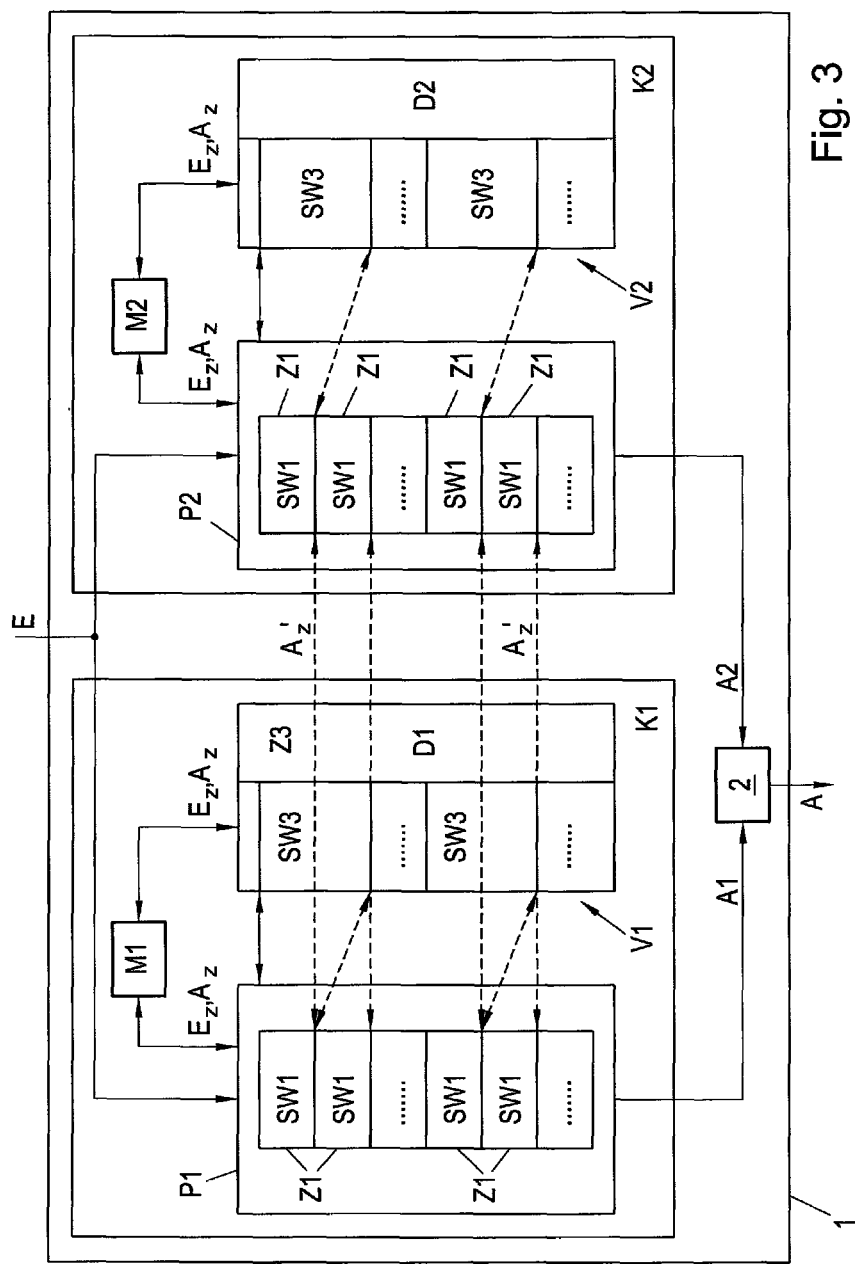
FIG. 3 depicts a safety-oriented automation component including verification of the automation component processing.

FIG. 3 depicts an implementation according to the invention of a multi-channel safety-oriented automation component 1. Each channel K1, K2 here again respectively comprises an active unit P1, P2, and a diagnostics unit D1, D2. Certain diagnostics functions are again programmed in diagnostics units D1, D2 for associated active units P1, P2. The hardware of active units P1, P2 here is homogeneous, and the same software SW1 runs here in both active units P1, P2, i.e., the same software SW1 runs in both channels K1, K2 in the same active units P1, P2.

Instead of software SW1, it is also possible to implement diversity software SW2 redundant relative to software SW1 running in first channel K1 in active unit P2 of second channel K2, as described, e.g., in FIG. 2, without departing from the inventive idea. Likewise, active unit P2 in second channel K2 could also be implemented as diversified hardware.

Diversity software SW3 redundant relative to software SW1 in active unit P1 is now implemented and run in a verification unit V1, e.g. diagnostics unit D1, in first channel K1. The processing of diversity software SW3 in verification unit V1 is thereby decoupled in terms of time from the processing of software SW1 in active unit P1, and thus in processing is independent in terms of time from the processing of software SW1 in active unit P1. Software SW1 in active unit P1 can therefore be e.g. a real-time application, whereas diversity software SW3 in verification unit V1 exhibits a different, in general, slower run time. Diversity software SW3 is nevertheless used in verification unit V1 to verify the processing of software SW1 in active unit P1. However, given slower diversity software SW3, this can now be effected only in each $n^{th}$, being a positive integer n>1, processing step Z1 of software SW1. To this end, current input data $E_z$ in first channel K1 for processing step Z1 of software SW1 and output data $A_z$ computed therefrom by software SW1 in active unit P1 of first channel K1 are temporarily stored in a memory unit M1. Diversity software SW3 in verification unit V1 reads this stored input data $E_z$ and output data $A_z$ from memory unit M1. Using this read input data $E_z$ diversity software SW3 also computes output data $A_z'$ that must equal to stored output data $A_z$ of software SW1 in active unit P1 if there are no errors. The calculation of output data $A_z'$ by diversity software SW3 can take longer than the calculation of output data $A_z$ in active unit P1. For example, the calculation in verification unit V1 can even be slower by a factor of 100 to 1,000 than in active unit P1. If output data $A_z$ and $A_z'$ that are compared in verification unit V1 are not equal, there is an error and verification unit V1 initiates an appropriate action, e.g., transferring automation component 1 into a safe state, sending an error message, or initiating another safety-oriented action. Once verification by software SW3 in verification unit V1 is completed, the next verification of current processing step Z1 can start, whereby any intermediate input data $E_z$ and output data $A_z$ computed therefrom by software SW1 do not have to be stored in memory unit M1.

If $t_1$ is the processing time for a processing step Z1 of software SW1 in active unit P1, and $t_2$ is the processing time for processing step Z3 of diversity software SW3 in verification unit V1, then it must apply $n \times t_1 > t_2$.

If verification unit V1, V2 is implemented in diagnostics unit D1, D2, then diversity software SW3 can run additionally apart from the diagnostics functions implemented as diagnostics software in diagnostics unit D1, D2, as indicated in FIG. 3.

The same verification can be effected in parallel in second channel K2, and in each additional channel, between software SW1—or SW2 in the case of diversity software in active units P1, P2—and diversity software SW3 redundant relative thereto in verification unit V2 of second channel P2.

The processing of software SW1 in active units P1, P2 of channels K1, K2 is therefore not retarded by the verification effected by diversity software SW3 in verification unit V1, V2. Verification of the processing by software SW1 in active units P1, P2 of both channels K1, K2 takes place in every $n^{th}$ processing step of software SW1.

In addition, in each processing step of software SW1 in first channel K1, output data A1 generated thereby can be compared in comparison unit 2 with output data A2 generated in second channel K1 during this processing step, and this enhances the level of verification for errors. If diversity hardware is used in both channels, it is possible here for delays to occur due to the variation in run times in the various active units P1, P2, which delays, however, are not caused by the diversity software.

Verification of the processing of software SW1 in automation component 1 is thus effected by time-decoupled diversity software SW3, which is implemented, for example, in diagnostics unit D1, D2, and which can monitor or verify every $n^{th}$ processing step of software SW1. In addition, output data A1, A2 generated by software SW1 from two channels K1, K2 can be compared in the usual way during each processing step of software SW1. As a result, the inherently poorer run-time behavior of diversity software can be compensated by the invention. It is furthermore irrelevant here whether or not diversified hardware is implemented.

Processing step Z is generally considered in this regard to be a complete computing operation in active unit P1, P2 effected by software SW1, SW2 running therein, e.g., a mathematical calculation by software SW1, SW2, the execution of a function or procedure of software SW1, SW2, the processing of input data according to a predefined scheme, a complete code cycle of software SW1, SW2, etc.

Active unit P1 of first channel K1, e.g., can be a processor supported by a floating-point unit FPU, and software SW1 running thereon can be a mathematical code. However, associated diagnostics unit D1 is, e.g., only a simpler processor that has only a floating-point library or a processor that does not use the FPU. Nevertheless the invention, for example, enables the high-performance FPU in active unit P1 to be checked by a low-performance floating-point library in diagnostics unit D1.

Using known methods of so-called coded processing, it is possible by an essentially automated approach to produce diversity software SW3 that is redundant relative to given software SW1. Diversity software SW3 produced thereby is typically a factor of at least 100 times slower than the original software. The invention now enables even diversity software SW3 produced by coded processing to be used, and this enables the expense of producing diversity software SW3 to be substantially reduced.

Despite the fact that the specification has been described only with reference to two-channel safety-oriented automation component 1, the invention can of course be applied analogously to an automation component 1 having more than two channels.

The invention claimed is:

1. A method for verifying the processing of an automation task, comprising software (SW1), in a multi-channel safety-oriented automation component, comprising:
   processing the software (SW1) for hardware of a first active unit (P1) of at least one channel (K1);
   processing first diversity software (SW3), which is redundant relative to the software (SW1), in a verification unit (V1) in the at least one channel (K1);
   at least temporarily storing input data (Ez) and first output data (Az) computed by the software (SW1) in a processing step (Z1);
   computing, in the verification unit (V1), a second output data (Az') by the first diversity software (SW3) based on the at least temporarily stored input data (Ez) and independently of the processing of the software (SW1) in the first active unit (P1); and
   comparing the second output data (Az') computed by the first diversity software (SW3) with the at least temporarily stored first output data (Az) of the software (SW1) in order to verify the processing of the software (SW1),
   wherein, due to a difference in processing times, a plurality of processing steps of software (SW1) occur for each processing step of first diversity software (SW3).

2. The method according to claim 1, wherein the processing of the software (SW1) is verified after an nth processing step (Z1) of the software (SW1), where n is a positive integer greater than one.

3. The method according to claim 1, the verification unit (V1) is implemented in a diagnostics unit (D1) in the at least one channel, and the method further comprises processing the first diversity software (SW3) and diagnostics functions comprising diagnostics in the at least one channel.

4. The method according to claim 1, further comprising verifying the processing of the software (SW1) in an at least a second channel (K2) of the multi-channel safety-oriented automation component.

5. The method according to claim 4, wherein output data (Az) are computed respectively in the at least one channel (K1) and in the at least one second channel (K2) of the multi-channel safety-oriented automation component (1) in a processing step (Z2) of the second diversity software (SW2), and the method further comprises comparing the output data (Az) following the processing step (Z2), wherein, due to a difference in processing times, a plurality of processing steps of software (SW1) occur for each processing step of second diversity software (SW2).

6. The method according to claim 1, further comprising:
processing a second diversity software (SW2), which is different from the software (SW1), for hardware of a second active unit (P2) of at least one second channel (K2) of the multi-channel safety-oriented automation component.

7. The method according to claim 6, wherein output data (Az) are computed respectively in the at least one channel (K1) and in the at least one second channel (K2) of the multi-channel safety-oriented automation component (1) in a processing step (Z1) of the software (SW1), and the method further comprises comparing the output data (Az) following the processing step (Z1).

* * * * *